US010865944B2

(12) United States Patent
Sebald

(10) Patent No.: US 10,865,944 B2
(45) Date of Patent: Dec. 15, 2020

(54) DETERMINING A GAS VOLUME IN A TANK DEVICE

(71) Applicant: ArianeGroup GmbH, Taufkirchen (DE)

(72) Inventor: Johannes Sebald, Bremen (DE)

(73) Assignee: ARIANEGROUP GMBH, Taufkirchen (DE)

( * ) Notice: Subject to any disclaimer, the term of this patent is extended or adjusted under 35 U.S.C. 154(b) by 212 days.

(21) Appl. No.: 16/026,255

(22) Filed: Jul. 3, 2018

(65) Prior Publication Data

US 2019/0011085 A1 Jan. 10, 2019

(30) Foreign Application Priority Data

Jul. 6, 2017 (DE) ........................ 10 2017 115 166

(51) Int. Cl.

*F17C 13/02* (2006.01)
*G01F 22/02* (2006.01)

(Continued)

(52) U.S. Cl.

CPC .............. *F17C 13/028* (2013.01); *F02K 9/50* (2013.01); *F02K 9/56* (2013.01); *F17C 13/008* (2013.01);

(Continued)

(58) Field of Classification Search

CPC .... F17C 13/028; F17C 13/008; F17C 13/023; F17C 13/025; F17C 13/026; F17C 13/04;

(Continued)

(56) References Cited

U.S. PATENT DOCUMENTS

| | | | |
|---|---|---|---|
| 3,596,510 | A | 8/1971 | Siegel et al. |
| 4,535,627 | A | 8/1985 | Prost et al. |

(Continued)

FOREIGN PATENT DOCUMENTS

| | | |
|---|---|---|
| DE | 3311982 | 10/1983 |
| DE | 3540768 | 4/1987 |

(Continued)

OTHER PUBLICATIONS

Translation of DE-102014109836-A1 (Year: 2016).*

(Continued)

*Primary Examiner* — Nathaniel T Woodward

(74) *Attorney, Agent, or Firm* — Greer, Burns & Crain, Ltd.

(57) ABSTRACT

A tank device for a tank liquid comprises a pressure vessel with a first chamber for the tank liquid and second chamber arranged in an interior of the tank. The first and second chamber are closed off with respect to each other and are in operative connection via at least one membrane which separates the first and second chambers and is capable of vibration. The tank device further comprises a controllable element for effecting a pressure surge in the pressure vessel, a pressure sensor for detecting a pressure vibration resulting from the pressure surge and a temperature sensor for measuring a temperature prevailing in the pressure vessel. An evaluation device of the tank device is configured to determine a current gas volume in the pressure vessel from a respectively detected pressure vibration and a measured temperature to thereby calculate the mass of the tank liquid.

17 Claims, 1 Drawing Sheet

100

16 17 10 12 11 14 18 13 20 19 15 200 300

(51) Int. Cl.

| | |
|---|---|
| ***F02K 9/50*** | (2006.01) |
| ***F02K 9/56*** | (2006.01) |
| ***F17C 13/00*** | (2006.01) |
| ***F17C 13/04*** | (2006.01) |

(52) U.S. Cl.
CPC .......... *F17C 13/023* (2013.01); *F17C 13/025* (2013.01); *F17C 13/026* (2013.01); *F17C 13/04* (2013.01); *G01F 22/02* (2013.01); *F17C 2201/0185* (2013.01); *F17C 2205/0326* (2013.01); *F17C 2205/0338* (2013.01); *F17C 2223/0161* (2013.01); *F17C 2250/043* (2013.01); *F17C 2250/0421* (2013.01); *F17C 2250/0426* (2013.01); *F17C 2250/0439* (2013.01); *F17C 2270/0197* (2013.01)

(58) Field of Classification Search
CPC ...... F17C 2201/0185; F17C 2205/0326; F17C 2205/0338; F17C 2223/0161; F17C 2250/0421; F17C 2250/0426; F17C 2250/043; F17C 2250/0439; F17C 2270/0197; F02K 9/50; F02K 9/56; F02K 9/44; G01F 22/02; G01F 23/22
USPC .......................................................... 73/149
See application file for complete search history.

(56) References Cited

U.S. PATENT DOCUMENTS

| | | | | |
|---|---|---|---|---|
| 4,770,033 | A | 9/1988 | Nicolai | |
| 2003/0000299 | A1 * | 1/2003 | Nakano | B64G 1/402 73/149 |
| 2008/0142639 | A1 | 12/2008 | Fotou et al. | |
| 2012/0198818 | A1 | 8/2012 | Boudier | |

FOREIGN PATENT DOCUMENTS

| | | | | |
|---|---|---|---|---|
| DE | 60209390 | T2 | 11/2006 | |
| DE | 102014109836 | A1 * | 1/2016 | G01F 22/02 |
| DE | 102014109836 | A1 | 1/2016 | |
| DE | 102014011652 | A1 * | 2/2016 | G01F 22/02 |
| DE | 102014011652 | A1 | 2/2016 | |

OTHER PUBLICATIONS

Translation of DE-102014011652-A1 (Year: 2016).*
European Search Report for corresponding European Patent Application No. 18180347.
"Optical Mass Gauging System for Measuring Liquid Levels in a Reduced Gravity Environment" (https://ntrs.nasa.gov/archive/nasa/casi.ntrs.nasa.gov/20100033282.pdf), Ryan M. Sullenberger, Wesley M. Munoz, Matt P. Lyon, Kenny Vogel, Azer P. Yalin, Valentin Korman and Kurt A. Polzin.

* cited by examiner

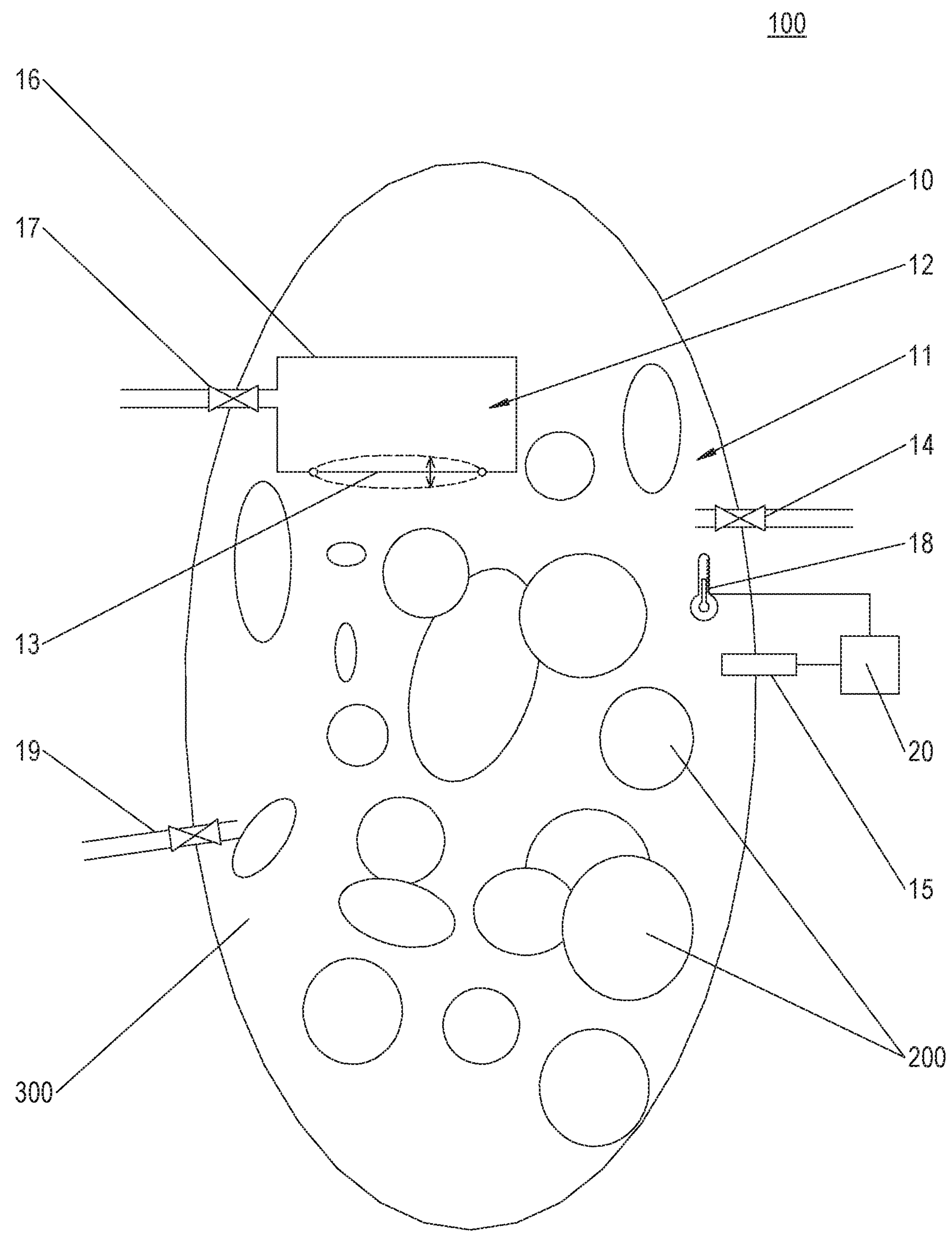
100
16
17
10
12
11
14
18
13
20
19
15
200
300

DETERMINING A GAS VOLUME IN A TANK DEVICE

CROSS-REFERENCES TO RELATED APPLICATIONS

This application claims the benefit of the German patent application No. 10 2017 115 166.4 filed on Jul. 6, 2017, the entire disclosures of which are incorporated herein by way of reference.

BACKGROUND OF THE INVENTION

The invention relates to a tank device for a tank liquid, a method for determining a (variable) gas volume in a tank device and a rocket having a tank device for use in space.

The amount of a tank liquid in a tank container is usually determined by means of the height of the respective liquid level. In the event of inclined positions, speed changes or vibrations of a vehicle, ship or aircraft comprising the container, inaccuracies in the measurement result from a procedure of this type. In addition, a capacitive fill level measurement of this type requires a coherent boundary layer (a so-called meniscus) between liquid and gas phase, as well as an arrangement of the liquid in the lower part of the tank container. In the case of tank containers of space rockets, these requirements are only fulfilled prior to the start or during the combustion phase of the power unit, as after switching off the power unit in space (during the so-called coasting phases), the liquid is separated during weightlessness into various, regions which are separated from one another by gas.

Different methods are therefore under discussion, in order to be able to determine the liquid volume in an alternative manner.

For example, in optical absorption measurement, the tank container is illuminated with a light source by means of multiple reflection. In this case, part of the light energy is converted into heat as a consequence of absorption of the light in the tank liquid. The remaining light quantity is measured and the liquid volume present is determined indirectly therefrom.

This method requires that the entire tank volume is illuminated by multiple reflections and that the measured light intensity actually corresponds to the average value (the tank must act like an Ulbricht sphere). The measuring method additionally requires complex optical instrumentation, which must also still fulfill the high mechanical and thermal demands inside a rocket.

A further optical method was described by Ryan M. Sullenberger, Wesley M. Munoz, Matt P. Lyon, Kenny Vogel, Azer P. Yalin, Valentin Korman and Kurt A. Polzin in the publication "Optical Mass Gauging System for Measuring Liquid Levels in a Reduced Gravity Environment" (https://ntrs.nasa.gov/archive/nasa/casi.ntrs/20100033282.pdf). This procedure is however technically still considerably more complex and sensitive, because an interferometric method is used here.

A device and a method for determining the liquid volume in a closed container are disclosed in the published document DE 33 11 982 A1. In this case, the device comprises a membrane, which is constructed like a loudspeaker membrane and to which a pulse can periodically be applied from the outside by means of electromotive means. The period of a resultant natural oscillation of the membrane can then be detected and a gas and a liquid volume can be calculated therefrom. The device and the method are designed for vehicles and not designed for use under weightlessness and with extreme pressure changes.

SUMMARY OF THE INVENTION

The present invention has an object of providing a technology for determining a variable content of a tank device avoiding the above-mentioned disadvantages, which is suitable for use in space rockets and is solid and easy to install.

A tank device according to the invention is used for accommodating or providing a tank liquid (which may be cryogenic fuel, in particular). The tank device comprises a pressure vessel, in the interior of which a first chamber and a second chamber are constructed. Mutually disjunct volume regions are to be understood as the first and second chambers in this case. In particular, the first chamber can surround the second chamber in whole or in part, or the second chamber can surround the first chamber in whole or in part.

The first chamber is configured to accommodate or to contain the tank liquid and/or a pressurization gas, which can be admitted or drained for driving the tank liquid out of the first chamber and/or for regulating a temperature in the first chamber. A pressurization gas of this type can, for example, be an inert gas such as nitrogen or helium.

The second chamber is closed off with respect to the first chamber, thus a gas or liquid exchange between the chambers is impossible.

In this case, the first and the second chamber are in operative connection by means of at least one membrane, which separates the first and second chambers and is capable of vibration; a pressure change in the first chamber therefore effects a volume change in the second chamber and vice versa, so that in each case a state of equilibrium is set, in which the same pressure (which is termed the equilibrium pressure here) prevails in both chambers.

The tank device additionally has at least one controllable element for generating a pressure surge in the pressure vessel; the pressure surge can, in particular, be directed into the first chamber or out of the first chamber and/or have a pulse time, which may be for example at most 0.5 seconds, at most 0.2 seconds or even at most 0.1 seconds.

Owing to the operative connection of the first and the second chamber, the membrane is set vibrating by means of a pressure surge of this type, which in turn entails pressure vibrations in the first and in the second chamber. A pressure sensor of the tank device is configured to detect a pressure vibration of this type in the first or the second chamber, for example in the form of a plurality of pressure values measured at different times (successively). In this manner, a damped periodic vibration of the membrane can be detected. The pressure sensor can be constructed as a piezo element or piezo sensor and/or be configured to be used also for effecting the pressure surge or for exciting a pressure vibration; the controllable element can comprise the pressure sensor, in particular.

The controllable element can, for example, comprise at least one piezo element, which can be, e.g., fastened on a tank wall and/or installed (in whole or in part) into a tank wall. According to a preferred embodiment, the controllable element comprises a controllable valve for gas supply and/or for gas discharge into the or out of the first chamber: The (gas) pressure in the first chamber (or in the gas chamber contained therein) can therefore be influenced by means of a valve of this type. The controllable valve can be connected to a control, which opens the same for effecting the pressure surge for a predetermined pulse time (and immediately closes the same again).

Furthermore, a tank device according to the invention has one or more temperature sensor(s) for (in each case) measuring a temperature prevailing in the pressure vessel.

An evaluation device for the tank is provided for determining a gas volume in the pressure vessel from a detected pressure vibrations (e.g., from the frequency and/or amplitude thereof, resulting from the measured values, around an equilibrium pressure which is established) and at least one temperature measured using the temperature sensor(s), preferably by means of a function rule determined taking into account one or more physical characteristics of specific parameter(s) of the gas; in this document "determining a gas volume" is also understood to mean the determination of a value from which the gas volume can be calculated by means of a bijective function rule; the same applies (see below) for "determining a volume of a tank liquid."

The gas volume may be the volume (current at the time of the determination) of the gas in the first chamber and/or in the pressure vessel (in total).

The evaluation device can furthermore be configured for determining the volume of the tank liquid (currently) contained in the pressure vessel or in the first chamber, for example from the determined gas volume, preferably taking into account a previously known interior volume of the pressure vessel of a volume of the first and/or the second chamber set after the fading of the pressure vibration.

A rocket according to the invention is configured to be used in space, preferably to fly from the Earth into space. It comprises at least one power unit and, to supply the same with fuel, at least one tank device according to the invention according to an embodiment disclosed in this document.

A method according to the invention is used for determining a gas volume (which is variable and current when the method is carried out) in a pressure vessel of a tank device. In this case, the pressure vessel has a first chamber for a tank liquid (which can in particular be cryogenic fuel) and a second chamber. The first and second chambers are disjunct volume regions (in particular, the first chamber can surround the second chamber in whole or in part or vice versa). They are closed off with respect to each other and are (as described above) in operative connection by means of at least one membrane, which separates the first and second chambers and is capable of vibration; so that a pressure change in the first chamber therefore effects a volume change of the second chamber and vice versa, until a state of equilibrium is set in each case, in which the same pressure (which is also termed the equilibrium pressure here) prevails in both chambers.

The method comprises measuring a temperature in the pressure vessel and exciting a pressure vibration in the first chamber by means of a controllable element, which, for example, can comprise a piezo element (e.g., fastened on a tank wall or installed (in whole or in part) into a tank wall) and/or at least one controllable valve. In particular, the excitation of the pressure vibration may comprise a (sudden) supply and/or drainage of gas into or out of the first chamber by means of such a valve of the pressure vessel. As described above, the excitation can, in particular, comprise opening such a valve for a predetermined pulse time (which, for example, can be at most 0.5 seconds, at most 0.2 seconds or even at most 0.1 seconds). Alternatively or additionally, the excitation of the pressure vibration can take place by means of at least one pulse of an included piezo element.

The pressure in the first and/or second chamber is detected as a consequence of the method according to the invention, for example in the form of a plurality of successively measured pressure values. A gas volume in the pressure vessel is determined from the detected pressure vibration and the measured temperature; the gas volume can, in particular, be the volume of the gas (current at the time of the determination) in the first chamber and/or in the pressure vessel (in total).

The determination preferably takes place by means of a function rule determined taking into account one or more physical characteristics of specific characteristics or specific parameter(s) of the gas.

According to an advantageous embodiment, the method additionally comprises the determination of the volume of the tank liquid contained in the pressure vessel (in the first chamber), for example taking into account a previously known interior volume of the pressure vessel and/or a volume of the first and/or the second chamber established after the fading of the pressure vibration.

In particular, the method according to the invention is suitable for determining a gas volume in the pressure vessel of a tank device according to the invention according to one of the embodiments disclosed in this document.

A tank device according to the invention, a rocket according to the invention and a method according to the invention enable a reliable determination of tank contents, even independently of external conditions, for example shocks, acceleration or braking of the tank device and influence of gravitational force. According to the invention, a respectively current gas volume in the pressure vessel can be determined in that the gas located together with the tank liquid in the first chamber is excited in a targeted manner and subsequently transient responses induced by this excitation in the form of pressure fluctuations in the first or the second chamber are measured and evaluated. The technical means required for or involved in this process are robust and are to be installed with little outlay.

The precise determination of the residual liquid in the pressure vessel, particularly at the end of a mission, possible according to the invention, additionally allows a more precise modelling for future missions, which allows a reduction of the safety margins in the case of the liquids to be tanked and thus a saving in terms of mass.

Preferably, a device according to the invention comprises a gas-permeable shielding device, which is configured to prevent or at least to reduce a contact of the membrane with tank liquid in the first chamber. Analogously, in a method according to the invention, the membrane is at least partially free from (that is to say uncovered by) tank liquid on a side facing the first chamber. In this manner, an optimum vibration behavior of the membrane can be ensured.

According to an advantageous embodiment of the present invention, the controllable element comprises a controllable valve for effecting the pressure surge, which is (additionally) connected to a gas supply for driving the tank liquid out of the pressure vessel (for example to the power unit) and/or to a gas outlet for pressure regulation in the pressure vessel, for example for effecting a cooling of the tank liquid. Thus, the valve can fulfill multiple functions, so that the volume determination therefore does not require an individual separate valve as additional component. The tank device can consequently be kept particularly simple and robust.

Analogously, the pressure sensor for detecting the pressure vibration can be part of a pressure regulation device of the tank device for regulating an internal pressure in the pressure vessel, which likewise enables a required complexity and therefore minimizes production outlay for the tank device and enables a high degree of robustness.

The second chamber can, after a single filling with gas (for example before a rocket, which comprises the tank device, is started), be sealed under a fixed pressure, so that then the mass of gas located in the second chamber can no longer be changed. The gas may be or may comprise helium, in particular.

Alternatively, the tank device may have a valve, through which gas can be introduced into the second chamber and/or drained from the second chamber. This valve, which in this document is also termed the "second valve," then allows a setting of an optimum volume of the second chamber for maintaining the capacity of the membrane to vibrate, for example after gas supply into or gas drainage out of the first chamber, preferably during an (at least substantially) vibration-free phase of the membrane. The tank device can comprise a pressure sensor for measuring a pressure in the second chamber and/or a control device for controlling one such second valve. Such a control device of the second valve can be configured to communicate with a control device for controlling a (first) valve for gas supply or for gas drainage into or out of the first chamber (which, as mentioned, may, in particular, correspond to the valve mentioned for effecting a pressure surge), or the tank device may comprise a common control device for controlling both of the valves mentioned.

Accordingly, an advantageous design variant of a method according to the invention comprises setting up (that is to say effecting) a volume of the second chamber, for example by supplying or draining gas through a (second) valve into or out of the second chamber. The setting up may comprise measuring a pressure in the second chamber and/or, in particular, take place after gas supply (e.g., for driving the tank liquid out of the pressure vessel) or gas drainage (e.g., for effecting cooling) into or out of the first chamber and/or during an (at least substantially) vibration-free phase of the membrane.

Preferably, the evaluation unit of a tank device according to the invention is configured to determine the mass of tank liquid in the pressure vessel from a determined gas volume or a volume of tank liquid in the pressure vessel calculated therefrom and a measured temperature in the pressure vessel; in this document "determining the mass" is also understood to mean the determination of a value from which the mass can be calculated by means of a bijective function rule. Accordingly, a method according to the invention preferably comprises such a determination of the mass of tank liquid in the pressure vessel.

A control of a power unit (which may, for example, be part of a rocket according to the invention) can be configured to ignite the power unit as a function of the determined mass of fuel in the pressure vessel or (if appropriate) to suppress the ignition thereof and/or to change a ratio of fuel to an oxidizer quantity in the pressure vessel depending on the fill level of the pressure vessel (particularly during flight). Thus, ignition can take place without sufficient fuel or oxidizer quantities and the danger of an explosion connected with this can be avoided, or an optimum fuel/oxidizer ratio can be set during the flight.

According to an advantageous embodiment, the excitation of the pressure vibration is carried out in a method according to the invention under weightlessness, under micro-gravitational conditions (particularly beyond Earth's atmosphere, for example after switching off at least one power unit) and/or during an acceleration of a rocket containing the tank device.

BRIEF DESCRIPTION OF THE DRAWINGS

In the following, a preferred exemplary embodiment of the invention is explained in more detail on the basis of a drawing. It is understood that a tank device according to the invention does not have to have all of the components shown or may contain further elements.

The FIGURE schematically shows a tank device according to an exemplary embodiment of the present invention.

DETAILED DESCRIPTION OF THE PREFERRED EMBODIMENTS

The tank device 100 illustrated in the FIGURE comprises a pressure vessel 10, in the interior of which a first chamber 11 and a second chamber 12 are constructed, of which the first chamber 11 substantially completely surrounds the second chamber 12. The first and the second chamber are, in this case, closed off with respect to each other and they are in operative connection by means of a membrane 13, which separates the first and second chambers and is capable of vibration. A pressure change in the first chamber 11 therefore effects a reaction of the membrane (e.g., distension in one or the other direction as indicated in the FIGURE by the double arrow) and a volume change in the second chamber 12 as a result and vice versa. Over time, a state of equilibrium is established in each case, in which the same (equilibrium) pressure prevails in both chambers.

The first chamber 11 is to some extent filled with a tank liquid 200 (for example cryogenic fuel, particularly for a rocket power unit); in the illustrated situation, the tank device is under at least approximate weightlessness, thus the tank liquid 200 does not form a coherent liquid level, but rather is divided into a multiplicity of droplets. In addition to the tank liquid 200, the first chamber 11 contains a gas 300 (e.g., an inert gas such as helium or nitrogen or a gas originating from the liquid).

The second chamber 12 is surrounded by a stable housing 16 and the membrane 13 and contains a gas (which may be, e.g., helium and/or the same gas as the first chamber 11 contains). By means of a (preferably controllable) valve 17, gas can, in the exemplary embodiment shown, be supplied to the second chamber 12 and/or drained from the same; when the valve is closed, the gas volume in the second chamber 12 is closed off. In particular, a predetermined volume of the second chamber 12 can be established by means of the valve 17 (e.g., after gas supply or gas drainage into or out of the first chamber) and thus a shaping or a state of the membrane 13 can be effected, which enables an advantageous vibration amplitude in the case of the excitation thereof. In addition, gas could also be conducted out of the first chamber 11 into the second chamber 12 by means of the valve 17. According to an alternative embodiment (not shown), the second chamber contains an unchangeable quantity (mass) of gas (e.g., helium) after filling and sealing, that is to say does not comprise a valve 17.

A control (not illustrated) of the valve 17 can be coupled to a control (likewise not illustrated) of at least one valve, by means of which gas (e.g., for the purpose of driving the tank liquid 200 out of the pressure vessel) can be introduced into the first chamber or by means of which gas 300 (e.g., for effecting a cooling) can be drained out of the first chamber and/or which is configured to effect a pressure surge in the pressure vessel:

The tank device 100 has such a valve 14, which is configured according to the invention to effect such a pressure surge in the pressure vessel 10, e.g., in that it is opened for a predetermined pulse time (which can, for example, be at most 0.5 seconds, at most 0.2 seconds or even at most 0.1 seconds) and closed again, so that gas 300 can enter into the first chamber 11 or exit from the same through the open valve 14 (depending on the applied pressure on both sides of the valve). As the gases enclosed in the chambers 11 and 12 together with the membrane 13 having a mass form a system, which is capable of vibration, inside the closed pressure vessel 10, a pressure surge of this type results in a vibration of the membrane 13 and therefore a pressure vibration in the first and the second chamber in each case (wherein the pressure-vibration amplitudes in the two chambers are complementary to one another).

The tank device 100 shown in the FIGURE further comprises a temperature sensor 18 for measuring a temperature prevailing in the pressure vessel (particularly in the first chamber 11). A second temperature sensor can be arranged for temperature measurement in the chamber 12 (not shown here). In the exemplary embodiment illustrated, respectively measured temperature values can be transmitted to the evaluation device 20.

In the example illustrated, a pressure sensor 15 is configured to measure the pressure periodically changing during the pressure vibration in the first chamber (multiple times successively), thus to detect the pressure vibration (including an equilibrium pressure which is set) in the first chamber 11 and to transmit associated measured values to an evaluation devices 20. The pressure sensor can (e.g., as a piezo sensor) also be used for excitation, that is to say to "ping" the gas compartment. The evaluation device 20 is preferably configured to determine a gas volume in the pressure vessel 10 from the pressure vibration or from the measured values obtained, describing the pressure vibration, and also a (current) temperature measured using the temperature sensor 18, e.g., a volume of gas 300 in the first chamber 11 and thus a volume of gas in the pressure vessel 10 as a whole. The evaluation device can furthermore be configured to calculate a volume of tank liquid 200 in the pressure vessel 10 (in the first chamber 11), preferably for the previously determined gas volume. This calculation can, for example, take place taking account of a previously known interior volume of the pressure vessel and/or a volume of the first chamber 11 and/or the second chamber 12 set after fading of the pressure vibration, taking account of physical constants of the gas.

The evaluation device 20 can additionally be configured, taking account of a (current) temperature measured by the temperature sensor 18, to calculate a mass of the tank liquid 200 (for example from the volume and density thereof) contained in the pressure vessel (namely in the first chamber 11).

The valve 14 for effecting a pressure surge can preferably be connected or be to be connected to a gas supply for driving the tank liquid 200 out of the pressure vessel into a supply line 19 leading to the power unit, and/or to a gas outlet for effecting a cooling of the tank liquid 200.

Thus, apart from effecting a pressure surge, the valve 14 can fulfill further functions, therefore does not have to be a valve additionally installed for the determination of the gas volume in the pressure vessel. Thus, a relatively simple structure of the tank device can be realized, which enables a low production outlay and a high robustness.

The pressure sensor 15 and/or the temperature sensor 18 can be connected to a control (not shown) of a valve, by means of which a gas supply for driving out the tank liquid and/or gas drainage for cooling can take place (wherein a valve of this type may, as mentioned, correspond to the valve 14 for effecting a pressure surge). The pressure sensor and/or the temperature sensor can therefore, in addition to contributing to determining a gas volume in the pressure vessel, fulfill at least one further function in each case, for example for regulating a respectively required pressure and/or temperature level in the pressure vessel.

A tank device 100 for a tank liquid 200 is disclosed. The tank device comprises a pressure vessel 10, in the interior of which a first chamber 11 for the tank liquid and second chamber 12 are arranged. The first and second chamber are closed off with respect to each other and are in operative connection by means of at least one membrane 13, which separates the first and second chambers and is capable of vibration. The housing 16 of the second chamber 12 can be fastened internally on the pressure vessel 10 or be part of the pressure vessel 10. The tank device further comprises a controllable element 14 for effecting a pressure surge in the pressure vessel 10, a pressure sensor 15 for detecting a pressure vibration resulting from the pressure surge and a temperature sensor 18 for measuring a temperature prevailing in the pressure vessel. An evaluation device 20 of the tank device 100 is configured to determine a current gas volume in the pressure vessel 10 from a respectively detected pressure vibration and a temperature measured using the temperature sensor 18. The mass of the tank liquid 200 present can be calculated therefrom.

Further disclosed are a rocket for use in space and a method for determining a (variable) gas volume in a pressure vessel of a tank device.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBERS

10 Pressure vessel
11 First chamber
12 Second chamber
13 Membrane
14 Valve for effecting a pressure surge
15 Pressure sensor
16 Housing of the second chamber 12
17 Valve for gas supply and/or for gas drainage into or out of the second chamber 12
18 Temperature sensor
19 Supply line for the power unit
20 Evaluation device
100 Tank device
200 Tank liquid
300 Gas

The invention claimed is:

1. A tank device for a tank liquid, wherein the tank device comprises:

a pressure vessel, in an interior of which a first chamber for the tank liquid and a second chamber are constructed, wherein the first and the second chamber are closed off with respect to each other and are in operative connection by means of at least one membrane, which separates the first and second chambers and is configured to vibrate;

at least one controllable element for effecting a pressure surge in the pressure vessel;

a pressure sensor for detecting a pressure vibration in at least one of the first or second chambers resulting from the pressure surge;

a temperature sensor for measuring a temperature in the pressure vessel, and an evaluation device configured to determine a gas volume in the pressure vessel from a detected pressure vibration and a measured temperature, wherein the controllable element comprises a controllable valve, via which a gas for effecting a pressure surge is let into the first chamber or is drained out of the first chamber.

2. The tank device according to claim 1, wherein the controllable valve is connected to a gas supply for driving the tank liquid out of the pressure vessel or to a gas outlet for pressure regulation.

3. The tank device according to claim 1, further comprising a valve for at least one of gas supply or gas drainage into or out of the second chamber.

4. The tank device according to claim 1, wherein the evaluation device is further configured to determine a volume of tank liquid in the pressure vessel.

5. The tank device according to claim 1, wherein the evaluation device is further configured to determine a mass of tank liquid in the first chamber.

6. The tank device according to claim 1, wherein the tank liquid is a cryogenic fuel.

7. The tank device according to claim 1, wherein the pressure sensor is at least one of constructed as a piezo sensor or is configured to be used for excitation.

8. The tank device according to claim 1, wherein a housing of the second chamber is fastened internally on the pressure vessel or is part of the pressure vessel.

9. A rocket for use in space, comprising a power unit, and at least one tank device for a tank liquid, wherein the tank device comprises:

a pressure vessel, in an interior of which a first chamber for the tank liquid and a second chamber are constructed, wherein the first and the second chamber are closed off with respect to each other and are in operative connection by means of at least one membrane, which separates the first and second chambers and is configured to vibrate;

at least one controllable element for effecting a pressure surge in the pressure vessel;

a pressure sensor for detecting a pressure vibration in at least one of the first or second chambers resulting from the pressure surge;

a temperature sensor for measuring a temperature in the pressure vessel, and an evaluation device configured to determine a gas volume in the pressure vessel from a detected pressure vibration and a measured temperature, the tank being configured to supply the rocket with fuel, wherein the controllable element comprises a controllable valve, via which a gas for effecting a pressure surge is let into the first chamber or is drained out of the first chamber.

10. A method for determining a gas volume in a pressure vessel of a tank device, wherein the pressure vessel has a first chamber for a tank liquid and a second chamber wherein the first and the second chamber are closed off with respect to each other and are in operative connection by means of at least one membrane which separates the first and second chambers and is capable of vibration, and wherein the method comprises:

exciting a pressure vibration in the first chamber by means of at least one of supplying gas into the first chamber by means of a controllable valve of the pressure vessel, draining gas out of the first chamber by means of a controllable valve of the pressure vessel;

detecting a pressure vibration in at least one of the first or second chamber;

measuring a temperature in the pressure vessel; and determining the gas volume in the pressure vessel from a detected pressure vibration and a measured temperature.

11. The method according to claim 10, additionally comprising determining a volume of the tank liquid in the first chamber.

12. The method according to claim 10, additionally comprising determining a mass of the tank liquid in the first chamber.

13. The method according to claim 10, additionally comprising setting up a volume of the second chamber before the excitation of the pressure vibration.

14. The method according to claim 10, wherein the excitation of the pressure vibration is carried out under a weightlessness condition of a rocket containing the tank device.

15. The method according to claim 10, wherein the excitation of the pressure vibration is carried out under a micro-gravitational condition of a rocket containing the tank device.

16. The method according to claim 10, wherein the excitation of the pressure vibration is carried out during acceleration of a rocket containing the tank device.

17. The method according to claim 10, wherein the tank liquid is a cryogenic fuel.

* * * * *